(12) United States Patent
Waldow et al.

(10) Patent No.: US 6,595,080 B2
(45) Date of Patent: Jul. 22, 2003

(54) LONGITUDINAL ADJUSTER HAVING A RELEASE ARRANGEMENT

(75) Inventors: Andreas Waldow, Einbeck (DE); Axel Wack, Einbeck (DE)

(73) Assignee: United Parts FHS Automobil Systeme GmbH, Dassel (DE)

( * ) Notice: Subject to any disclaimer, the term of this patent is extended or adjusted under 35 U.S.C. 154(b) by 0 days.

(21) Appl. No.: 09/969,754

(22) Filed: Oct. 3, 2001

(65) Prior Publication Data

US 2002/0062707 A1 May 30, 2002

(30) Foreign Application Priority Data

Nov. 25, 2000 (DE) .................................... 200 20 039 U

(51) Int. Cl.[7] .............................. F16C 1/10; F16B 21/00
(52) U.S. Cl. ................. 74/502.4; 74/500.5; 74/501.5 R; 74/502; 74/502.6; 403/326; 403/327; 403/DIG. 7
(58) Field of Search ............................. 74/500.5–503; 385/56, 76, 147; 403/326, 327, DIG. 7

(56) References Cited

U.S. PATENT DOCUMENTS

| | | | | |
|---|---|---|---|---|
| 5,142,933 A | * | 9/1992 | Kelley ........................ 74/502 |
| 5,280,733 A | * | 1/1994 | Reasoner ................... 74/502.4 |
| 5,435,203 A | * | 7/1995 | Spease et al. .............. 74/502.6 |
| 5,481,634 A | * | 1/1996 | Anderson et al. ............. 385/76 |
| 5,598,743 A | * | 2/1997 | Yasuda ...................... 74/502.4 |
| 5,605,074 A | * | 2/1997 | Hall et al. .................. 74/502.6 |
| 5,653,148 A | * | 8/1997 | Reasoner ................... 74/502.4 |
| 5,828,804 A | * | 10/1998 | Akins et al. .................. 385/58 |
| 6,116,111 A | * | 9/2000 | Burger .................... 74/501.5 R |
| 6,216,555 B1 | * | 4/2001 | Malone ...................... 74/502.6 |
| 6,224,268 B1 | * | 5/2001 | Manning et al. ............... 385/56 |

FOREIGN PATENT DOCUMENTS

| | | | | |
|---|---|---|---|---|
| DE | 198 25 359 A1 | 6/1998 | ............... 74/502.4 |
| DE | 198 25 360 A1 | 6/1998 | ............... 74/502.4 |

\* cited by examiner

*Primary Examiner*—Vinh T. Luong
(74) *Attorney, Agent, or Firm*—Cohen, Pontani Lieberman & Pavane

(57) ABSTRACT

A longitudinal adjuster having a release device on a core of an actuating-pull mechanism for use, e.g., on motor vehicles has a connecting eyelet on an end of a housing. An end of the core includes a toothing arrangement which is engageable with a toothing arrangement carried on a retaining pawl in the housing. Normally, the adjuster is maintained in closed condition by a spring acting on the housing and a slide on the housing. The slide can be moved in opposition to the spring to place the adjuster in open condition. In open adjuster condition, the retaining pawl is displaceable such as to disengage the toothing arrangements thus allowing adjustment of a distance between the connecting eyelet and the core end.

11 Claims, 3 Drawing Sheets

LONGITUDINAL ADJUSTER HAVING A RELEASE ARRANGEMENT

BACKGROUND OF THE INVENTION

1. Field of the Invention

The present invention relates to a longitudinal adjuster having a release device on a core of an actuating pull mechanism which comprises an eyelet on a housing, shaped parts and a spring which enables the distance between the end of the core and the eyelet to be adjusted, and more particularly to such an adjuster for use wherever a longitudinal adjustment of actuating-pull mechanisms and a rapid and simple release thereof is required.

2. Description of the Related Art

Longitudinal adjusters for actuating-pull mechanisms are used in order to fasten actuating-pull mechanisms, to adjust them precisely and to compensate for tolerances. This is the case, for example, with actuating-pull mechanisms of motor vehicles which connect the actuating means and the part which is to be actuated to each other. When installed, the actuating-pull mechanisms have to have a defined length, since the distance between the parts does not always correspond to the length of the actuating-pull mechanism. A correction therefore has to be undertaken. This correction is usually undertaken by longitudinal adjusters. The same is true when parts become worn. The play arising as a result between the actuating means and the parts to be actuated requires the longitudinal adjuster to be released again and to be reset.

Various mechanisms are known as longitudinal adjusters for actuating-pull mechanisms. As a rule, parts which interengage in a positive-locking manner are used in order to produce the appropriate distance. In addition, triggering mechanisms can ensure rapid locking when the longitudinal adjuster is to be locked at inaccessible locations.

DE 198 25 359 A1 discloses a longitudinal adjuster of this type, in which an actuating-pull mechanism is set and locked by means of two shaped parts. Although the longitudinal adjuster described has the advantage of being able to be fastened rapidly and reliably to the actuating-pull mechanism even if the fastening location is difficult for the fitter to access, its disadvantage is that its design means that it cannot be readily opened and released again in every position.

DE 198 25 360 A1 discloses an infinitely variable longitudinal adjuster, in which rapid and secure setting of the length can be undertaken by means of a spring and two clamping levers. However, this arrangement requires freedom for installing it to enable the levers to move.

SUMMARY OF THE INVENTION

The object of the invention is therefore to develop a longitudinal adjuster with which the tolerances of an actuating-pull mechanism can be compensated for in a simple manner, the intention being for secure and simple locking and releasing of the longitudinal adjuster to be possible even in the event of little freedom for installing it.

In accordance with the invention there is provided a longitudinal adjuster having a release device on a core of an actuating-pull mechanism which comprises a housing, the housing having an eyelet at an end thereof, an end of the core being connectable at an opposite end of the housing. An inner shaped part on said core end carries a first toothing arrangement, and a housing outer part including a retaining pawl carries a second toothing arrangement, the first and second toothing arrangements engaging with each other when the adjuster is in a closed condition. The adjuster includes a slide, the slide carrying a latching lug. A spring extends between the housing and the slide and normally acts to maintain the adjuster in closed condition. The slide is moveable in opposition to the spring to a latched position providing an adjuster open condition and wherein the latching lug is hooked to said housing and said retaining pawl is displaceable for disengaging the first and second toothing arrangements from each other so that a distance between the eyelet and said core end can be changed.

The longitudinal adjuster having a release device on the core of an actuating-pull mechanism comprises a connecting eyelet on a housing, shaped parts and a spring which enables the distance between the end of the cable and the connecting eyelet to be adjusted.

A longitudinal adjuster is distinguished in that in the opened state or condition of the longitudinal adjuster, a latching lug on the slide of the longitudinal adjuster is hooked in the housing in such a manner that a spring situated between the housing and the slide is clamped and a retaining pawl, which protrudes through the housing behind the slide, can be displaced with its toothing arrangement with respect to a toothing arrangement of a shaped part on the core of an actuating-pull mechanism. The toothing arrangement may have different shapes which are technically effective. Different materials, for example plastic, may be used. It is also essential to the invention that the slide can be displaced by means of a spring in the direction of the retaining pawl and displaces the latter, via its wedge-shaped surface with its toothing arrangements situated on the inside, onto the toothing arrangements of a shaped part on the core of the actuating-pull mechanism and therefore fixes the longitudinal adjuster in place.

It is also essential, in order to release the longitudinal adjuster, for a guide lug to be arranged between the housing and the slide. One advantageous design is for the latching lug to protrude through an opening in the housing. The latching lug can constitute a plastic spring tongue having a wedge-shaped hook. A helical spring can be arranged as the spring between the housing and slide. A groove for an opening tool, for example a pointed object such as a screwdriver, can be arranged on the slide. The latching lug can advantageously protrude through an opening in the housing. The lower side of the slide has a groove for guiding the guide lug of the retaining pawl. Movement of the retaining pawl is therefore possible.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
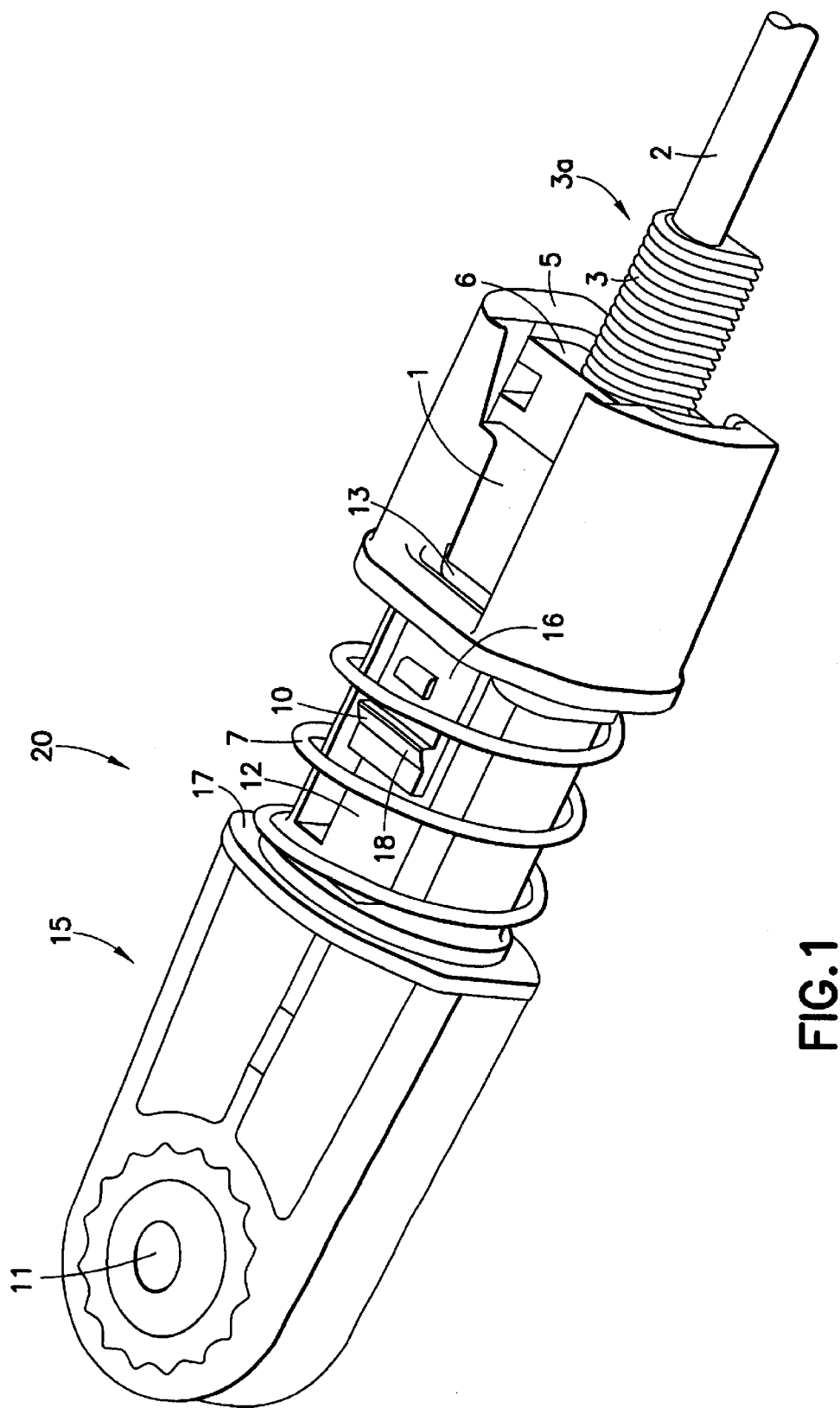
FIG. 1 is a perspective view of the longitudinal adjuster in closed condition.
Figure 2:
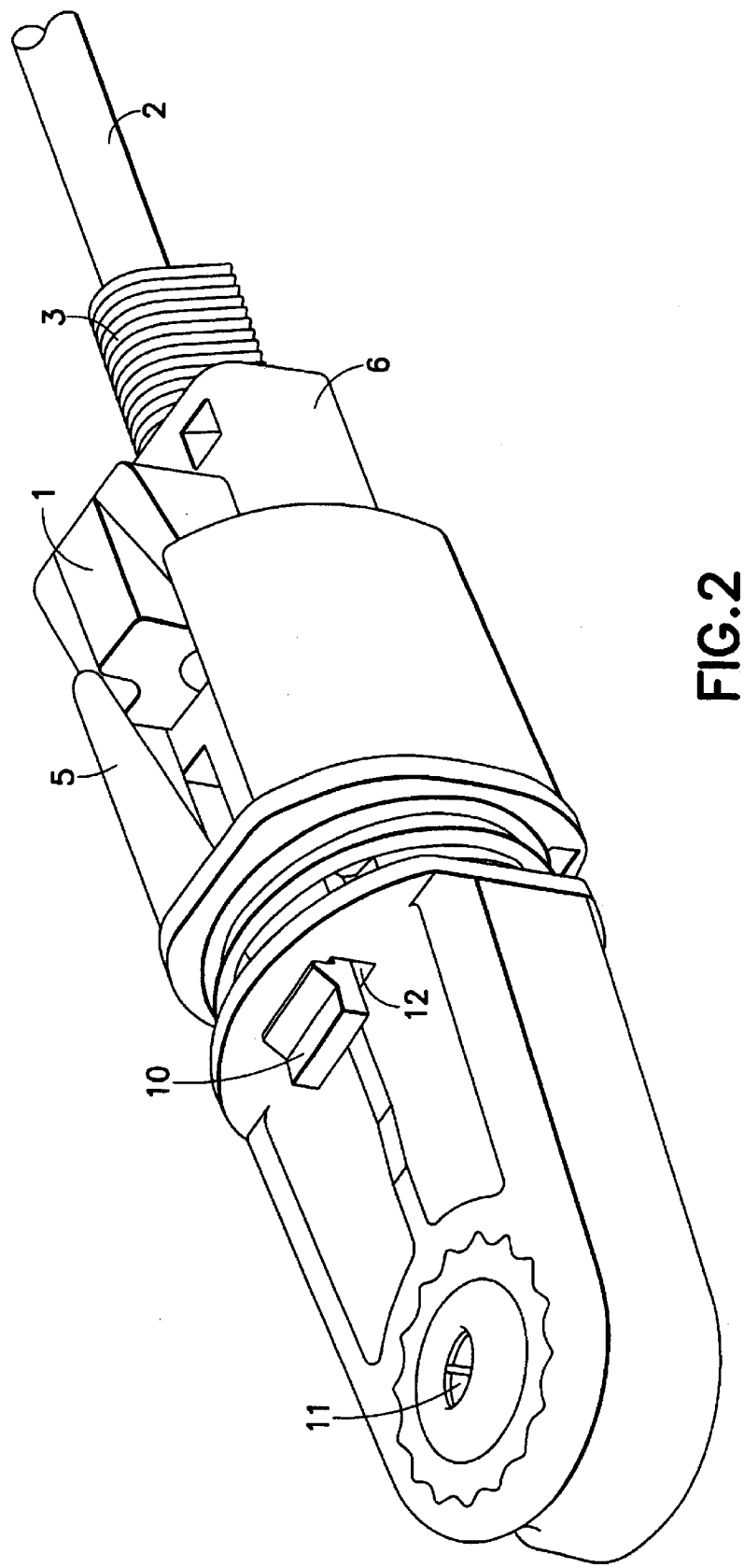
FIG. 2 is a perspective view from above of the longitudinal adjuster in an open condition.
Figure 3:
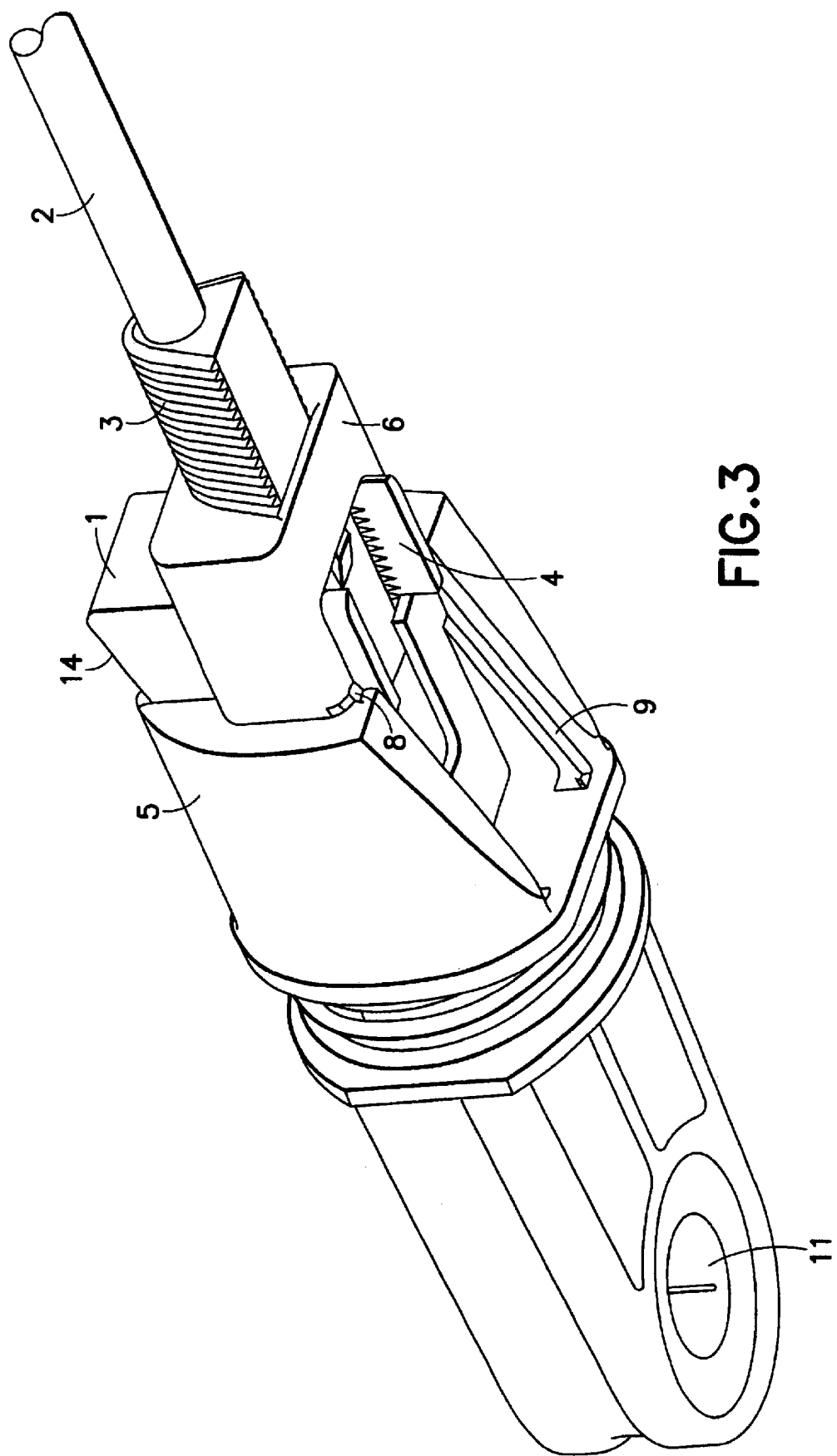
FIG. 3 is a perspective view from below of the longitudinal adjuster in an open condition.

FIG. 1 shows a perspective view of the longitudinal adjuster 20 according to the invention in a closed state or condition. The connecting eyelet 11 intended for fastening is arranged in the housing 15 on the one side of the adjuster, the core 2 of the cable-pull mechanism is situated on the other side. Arranged on a core 2 is inner shaped part 3a having a first toothing arrangement 3 which engages in second toothing arrangement 4 of the outer shaped part or retaining pawl 1 having a wedge-shaped surface 14 (FIG. 3). The spring 7 exerts a force between the slide 5 and abutment 17. A groove 13 for, e.g., a screwdriver is arranged in the slide 5. In order to open the longitudinal adjuster from normally closed condition thereof wherein it is held by action of spring 7, slide 5 has to be displaced counter to the force of the spring 7 in the direction of the opening 12 for the guide or latching lug 10, as a result of which the latching lug 10 latches behind the opening 1 and releases the retaining pawl 1. The latching lug 10 is preferably constructed as a plastic spring tongue 16 having a wedge-shaped hook 18. This allows that the retaining pawl 1, can then be pulled out, as a result of which the toothing arrangements 3, 4 are released from each other and the slide 5 can be set to a different distance. The then open longitudinal adjuster 20 is shown in FIGS. 2 and 3.

As soon as the desired distance between the connecting eyelet 11 and core 2 has been set, the latching lug 10 can be pressed down by means of a screwdriver or another suitable tool, so that the spring 7 displace the slide 5 over the housing part 6 and causing the retaining pawl 1 toothing arrangement 4 to e pushed in a direction of the toothing arrangement 3 and to engage the toothing arrangement of the inner shaped part. The longitudinal adjuster 20 is set thereby. In other words, slide 5 n this movement displaces the retaining pawl 1 via wedge-shaped surface 14 of the retaining pawl (see FIG. 2) 50 that the toothing arrangement 4 is pressed onto toothing arrangement 3 an therefore fixing of the logitudinal adjuster 20 in place is established. The slide 5 remains stressed by the force of the spring, with the result that it is always pushed in the retaining direction in the event of vibrations that occur in the case of vehicles.

The slide 5 has a lower side groove 9 in guiding relationship with guide lug 8 of the retaining pawl.

The arrangement has the advantage that easy adjustment, closing and opening is possible even at locations which are difficult to access.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A longitudinal adjuster having a release device on a core of an actuating pull mechanism, comprising:

a housing including an eyelet and an abutment;

a slide, said slide carrying a latching lug extending between said slide and said eyelet;

an inner shaped part on the core, said inner shaped part carrying a first toothing arrangement, the housing including a retaining pawl, said retaining pawl carrying a second toothing arrangement, said first toothing arrangement engaging with said second toothing arrangement when the adjuster is in a closed condition; and a spring extending between said abutment of the housing and the slide and normally acting to maintain the adjuster in the closed condition by pushing said second toothing arrangement toward said first toothing arrangement, said slide being moveable in opposition to said spring to a latched position providing an adjuster open condition wherein said latching lug is hooked to said housing and said retaining pawl is displaceable for disengaging said first and second toothing arrangements from each other so that a distance between said eyelet and an end of said core can be changed.

2. The longitudinal adjuster according to claim 1, wherein said retaining pawl includes a wedge-shaped surface which on unlatching of said slide is pushed in a direction toward said first toothing arrangement by spring induced displacement of said slide so as to cause displacement of said retaining pawl such as to reengage the second toothing arrangement with the first toothing arrangement and to fix the adjuster in place.

3. The longitudinal adjuster according to claim 1, wherein said latching lug is arranged between the housing abutment and the slide for effecting securement and release of the adjuster.

4. The longitudinal adjuster according to claim 1, wherein the housing includes an opening for reception of said latching lug to hook said latching lug to said housing.

5. The longitudinal adjuster according to claim 1, wherein said latching lug comprises a spring tongue having a wedge-shaped hook.

6. The longitudinal adjuster according to claim 5, wherein the spring tongue is of plastic.

7. The longitudinal adjuster according to claim 1, wherein said spring is a helical spring.

8. The longitudinal adjuster according to claim 1, wherein said slide includes a tool access groove.

9. The longitudinal adjuster according to claim 8, wherein the housing includes an opening through which said latching lug protrudes when the slide is latched when the adjuster in an open condition.

10. The longitudinal adjuster according to claim 1, wherein said retaining part comprises a guide lug and wherein a lower side of the slide includes a groove for guiding said guide lug of said retaining pawl.

11. A longitudinal adjuster having a release device on a core of an actuating pull mechanism, comprising:

a housing;

an eyelet on he housing;

an inner shaped part on the core, said inner shaped part carrying a first toothing arrangement, the housing including a retaining pawl, said retaining pawl carrying a second toothing arrangement, said first toothing arrangement engaging with said second toothing arrangement when the adjuster is in a closed condition;

a slide, said slide carrying a latching lug; and a spring extending between the eyelet and the slide and normally acting to maintain the adjuster in the close condition, said slide being moveable in opposition to said spring to a latched position providing an adjuster open condition wherein said latching lug is hooked to said housing and said retaining pawl is displaceable for disengaging said first and second toothing arrangements from each other so that a distance between said eyelet and an end of said core can be changed;

further comprising a latching lug arranged between the housing and the slide for effecting securement and release of the adjuster.

* * * * *